(12) United States Patent
Yan et al.

(10) Patent No.: US 10,339,562 B2
(45) Date of Patent: Jul. 2, 2019

(54) PROTECTING IDENTITIES OF USERS TO WHOM ADVERTISING IS TARGETED

(75) Inventors: Hong Yan, Mountain View, CA (US);
Gokul Rajaram, Los Altos, CA (US);
Ami Vora, San Francisco, CA (US);
Mark E. Zuckerberg, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 557 days.

(21) Appl. No.: 13/306,901

(22) Filed: Nov. 29, 2011

(65) Prior Publication Data

US 2013/0138569 A1    May 30, 2013

(51) Int. Cl.
*G06Q 30/02* (2012.01)

(52) U.S. Cl.
CPC ......... *G06Q 30/0251* (2013.01); *G06Q 30/02* (2013.01); *G06Q 30/0261* (2013.01); *G06Q 30/0269* (2013.01)

(58) Field of Classification Search
USPC ................ 705/14.49, 14.58, 14.66
See application file for complete search history.

(56) References Cited

U.S. PATENT DOCUMENTS

| | | | | |
|---|---|---|---|---|
| 8,239,256 B2 * | 8/2012 | Heiser, II | .......... | G06F 17/30867 705/14.1 |
| 2002/0019831 A1 * | 2/2002 | Wade | .......... | G06Q 30/02 715/202 |
| 2006/0218577 A1 * | 9/2006 | Goodman | .......... | G06Q 30/02 725/32 |
| 2009/0070219 A1 * | 3/2009 | D'Angelo | .......... | G06Q 10/10 705/14.56 |
| 2011/0093780 A1 * | 4/2011 | Dunn | .......... | G06Q 30/0269 715/706 |
| 2011/0191142 A1 * | 8/2011 | Huang | .......... | G06Q 30/0204 705/7.33 |
| 2011/0191185 A1 * | 8/2011 | Schroeder | .......... | G06Q 30/0261 705/14.58 |
| 2012/0284127 A1 * | 11/2012 | Heiser, II | .......... | G06F 17/30867 705/14.66 |

* cited by examiner

*Primary Examiner* — Jay Huang
(74) *Attorney, Agent, or Firm* — Fenwick & West LLP

(57) ABSTRACT

A system environment supporting one or more advertisers and one or more ad publishers provides a means of sharing user-targeted advertisement. One or more hashing modules in the system environment provide the advertisers and ad publishers a means of sharing this information without revealing a user's personally identifiable information (PII). If a lossy hash is chosen, then an advertiser can communicate targeted advertisements to an ad publisher without revealing any PII to the ad publisher that the ad publisher did not already know.

12 Claims, 4 Drawing Sheets

PROTECTING IDENTITIES OF USERS TO WHOM ADVERTISING IS TARGETED

BACKGROUND

This invention relates generally to web-based distribution of content, such as advertising, and more specifically to targeting advertising to a specific set of users without sharing the identities of the users to whom the advertising is targeted.

An advertiser may want to display online advertisements to users who are likely interested in an advertised product. Advertisers, such as online merchants, typically collect data about their users and determine advertisements that are suited to a particular user based on that collected data. The advertisers may then send the advertisement, along with some form of metadata associating that advertisement with the user, to an ad publisher. This poses a number of challenges.

Traditionally, advertisers use "cookies" stored on a user's device to indicate to an ad publisher to serve a particular ad to the user. This is problematic in the modern age, as one user may have multiple devices (such as a laptop computer, a desktop computer, or a mobile phone), and multiple users may share a single device. Since there is often not a one-to-one relationship between users and devices, a cookie stored on a device is an inaccurate way to target advertising to a particular user. For example, if advertisers gather information on a user while the user is using one device, and then the user switches to a different device, this information could not be used to inform ad publishers when the user is using the second device.

Instead of using cookies, an advertiser could directly send the information to the ad publisher indicating the identities of the users who are to receive a particular ad. This would allow for the advertiser and the ad publisher to target the user no matter which device they are using. However, the user may have no previous relationship with the ad publisher or otherwise want to create a relationship with the ad publisher. By directly sending the user's information, the ad source risks exposing the user's personally identifiable information (PII), as well as other information, to the ad publisher, as well the broader public. This type of exposure threatens the user's privacy. For example, an ad publisher may not already have the PII of a user, and if the advertiser identifies the user to the ad publisher (e.g., by email address) this will result in the possibly unwanted sharing of the user's PII with the ad publisher. Due to laws governing privacy, as well as user-distrust of companies that risk the privacy of their information, advertisers would be remiss to exposes their users' PII.

Advertisers have not yet been able to securely communicate targeted advertisements to users, regardless of their device, without exposing the users' information to the ad publishers who do not otherwise have the information.

SUMMARY

A system environment supporting one or more advertisers and one or more ad publishers provides a mechanism to target advertising to particular users without sharing the users' PII with the ad publishers. One or more hashing modules in the system environment may be used to share information that identifies a user without revealing the user's PII to ad publishers that do not already have the user's PII.

In various embodiments, an advertiser determines that one or more users should be targeted with an advertisement. The advertiser uses a hashing module to create a secure identifier hash for each of the users. The advertiser then transmits the advertisement and associated secure identifier hashes to an ad publisher. This list of identifier hashes act as targeting criteria for the ad publisher to apply; if a user is identified by one of the identifier hashes in the list, the user meets the targeting criteria and is thus eligible to be shown the ad. Upon receiving a request from a user for an advertisement (e.g., a request for a web page on which an ad is to be served), the ad publisher uses an equivalent hashing module to create a secure identifier hash for this user. If the secure identifier hash matches any of the secure identifier hashes received from the advertiser, the ad publisher determines that the user may be shown the associated advertisement (i.e., the targeting criteria has been met). It is noted that additional targeting criteria may be applied. The ad publisher may automatically serve the ad to the user, or the ad publisher may include the ad in an auction process along with other candidate ads that may be shown to the user (e.g., based on the ads' associated targeting criteria) and then select an ad to show the user from those candidate ads.

In various embodiments, the hashing module comprises a one-way hashing algorithm to convert a unique user identifier, such as an email address, into a secure identifier hash. If a lossy hash is chosen, then an advertiser can communicate targeted advertisements to an ad publisher without revealing any PII to the ad publisher that the ad publisher did not already know.

The features and advantages described in this summary and the following detailed description are not all-inclusive. Many additional features and advantages will be apparent to one of ordinary skill in the art in view of the drawings, specification, and claims hereof.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Figure 1:
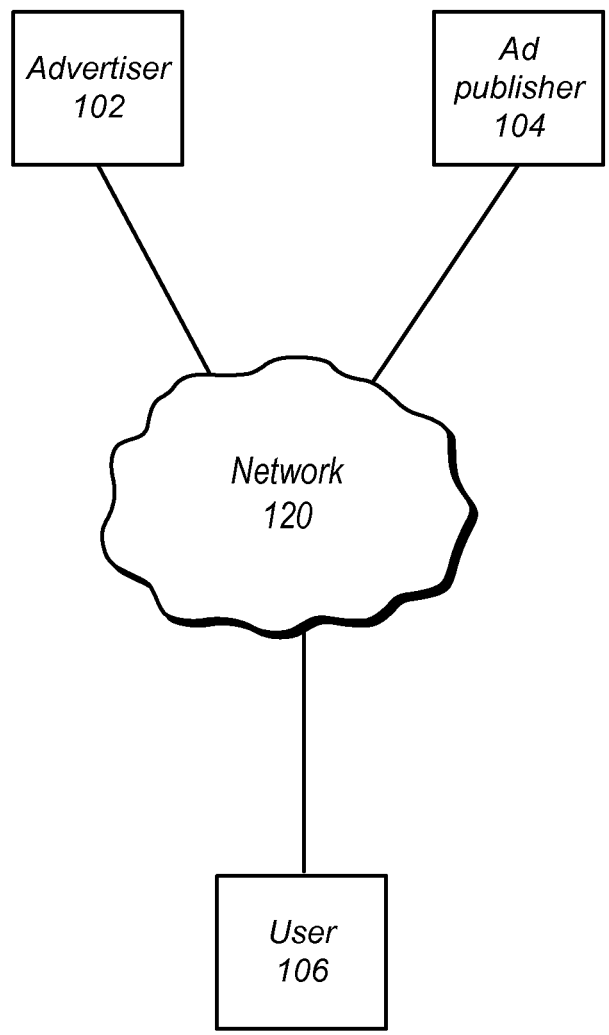
FIG. 1 is a high-level block diagram of a system environment in accordance with an embodiment of the invention.

FIG. 1 illustrates a system environment supporting advertisement delivery in accordance with embodiments of the invention. The system environment includes one or more advertisers 102, one or more ad publishers 104, and one or more users 106. These systems are connected by a network 120. For the sake of clarity, FIG. 1 depicts only one instance of advertiser 102, ad publisher 104, and user 106, though there could be any number of each.

The advertisers 102 provide advertisements to the ad publishers 104 for publication. Advertisers may be online merchants or vendors or service providers, such as law firms or consulting firms. Advertisers may create advertisements themselves, or merchants may rely on third party advertisers to create and manage the advertisements. Advertisers may gather interaction data from users 106 of their websites or stores and target certain users with specific advertisements based on the interaction data. Advertisers may use an electronic network to transmit advertisements and the targeted users to the ad publishers.

The ad publishers 104 publish advertisements from the advertisers 102. The ad publishers may be any website, server, or other system that provides advertising space to users, such as within a social networking system, a blog, a search engine, or a video watching page. In a system with a plurality of ad publishers, one ad publisher may serve as an advertiser to a different ad publisher.

The user 106 may be an individual, organization, or similar entity that accesses content from the advertisers and/or the ad publishers through a client device. The user may be identifiable by one or more items of PII, such as a name, an email address, a phone number, a SIM card identifier, a MAC address, and/or social security number. A client device might be, for example, a personal computer, a laptop, a personal digital assistant, a cellular, mobile, or smart phone, a set-top box, a digital video recorder (DVR), or any other network enabled consumer electronic ("CE") device. The client device may or may not be able to store data, such as a cookie, locally.

Note that the terms "user," "client," "advertiser," and "ad publisher" as used herein may refer to software providing client, advertiser, and publisher functionality, to hardware devices on which the software executes, or to the entities operating the software and/or hardware, as is apparent from the context in which the terms are used.

The network 120 facilitates communication between the various components of the system environment. The network 120 is typically the Internet, but may be any network, including but not limited to a LAN, a MAN, a WAN, a mobile wired or wireless network, a private network, or a virtual private network.

Figure 2:
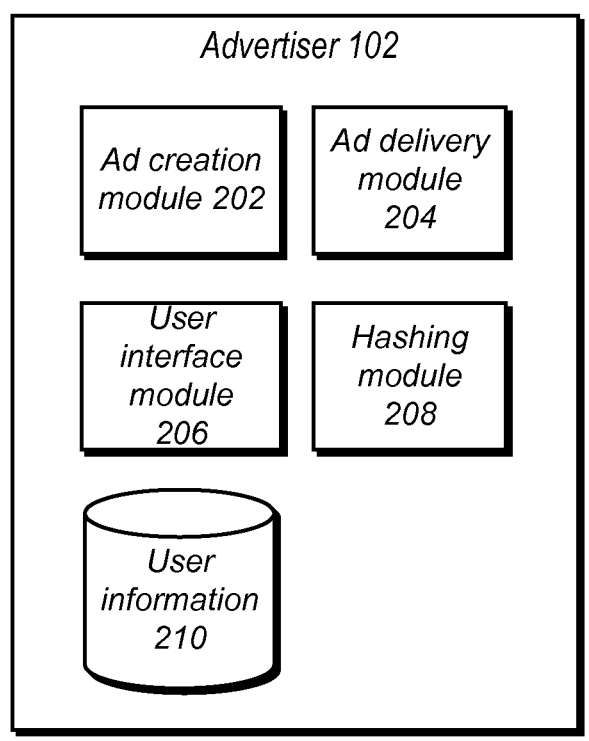
FIG. 2 illustrates an advertiser system, in accordance with an embodiment of the invention.

Referring now to FIG. 2, illustrated is one embodiment of an advertiser 102. The advertiser includes an ad creation module 202, an ad delivery module 204, a user interface module 206, a hashing module 208, and a user information store 210.

The ad creation module 202 allows the advertiser 102 to create advertisements. The ad creation module 202 may automatically create advertisements based on the products and services provided by the advertiser, or it may import advertisements created by third parties. Advertisements created by the ad creation module may be sent to the ad delivery module 204 for delivery to the ad publishers 104.

The ad delivery module 204 allows the advertiser 102 to deliver advertisements to the ad publisher 104. The ad delivery module 204 communicates with the ad creation module 202 and the user interface module 204 to collect one or more advertisements and their associated list of targeted users. The ad delivery module 204 then sends this information to the ad publisher 104. In various embodiments, the ad delivery module 204 may also communicate with the hashing module 208 in order to collect a list of secure identifier hashes instead of a list of users.

The user interface module 206 provides the advertiser 102 with a means to interact with its users. The user interface module may include an online storefront, a description of parts and services, a blog, a social network, or any such website. The user interface module 205 may be capable of collecting data on user use patterns, such as click rates, viewing statistics, or shopping cart selections. In various embodiments, it stores this data with the associated user in the user information store 210. Based on this data, the user interface module may target specific users with specific advertisements from the advertisement creation module. It then sends this information to the ad delivery module 204. This information may also be stored in the user information store. In various embodiments, the user interface module first sends this list of users to the hashing module 208, and then sends the list of secure identifier hashes to the ad delivery module.

The hashing module 208 provides the advertiser 102 with a means of generating a secure identifier hash. In various embodiments, the hashing module takes in an item of PII, such as a name, an email address, or a username, and applies a hashing function to generate a secure identifier hash. The hashing function may be any transformation function that converts PII into a secure identifier hash. This hashing function may be a lossy, deterministic, and/or one-way function, such as a checksum or an asymmetric encryption function. The secure identifier hash may be any combination of numbers, letters, or symbols. The hashing module 208 may support more than one hashing function. The hashing module 208 communicates with the user interface module 206 and the user information store 210 both to receive one or more users and pieces of PII, and send a list of secure identifier hashes. In various embodiments, the hashing module may be separate from the advertiser and instead directly connected to the network 120. In this way, one hashing module may be shared by one or more advertisers and ad publishers 104.

The user information store 210 provides the advertiser 102 with a store of user information. The user information store contains user information, including one or more of an email address, a username, a password. User information may also comprise a secure identifier hash, user use patterns, and any advertisement that have been targeted at the user. In various embodiments, the user information store communicates with the ad delivery module 204, the user interface module 206, and the hashing module 208 to transmit or receive user information.

Figure 3:
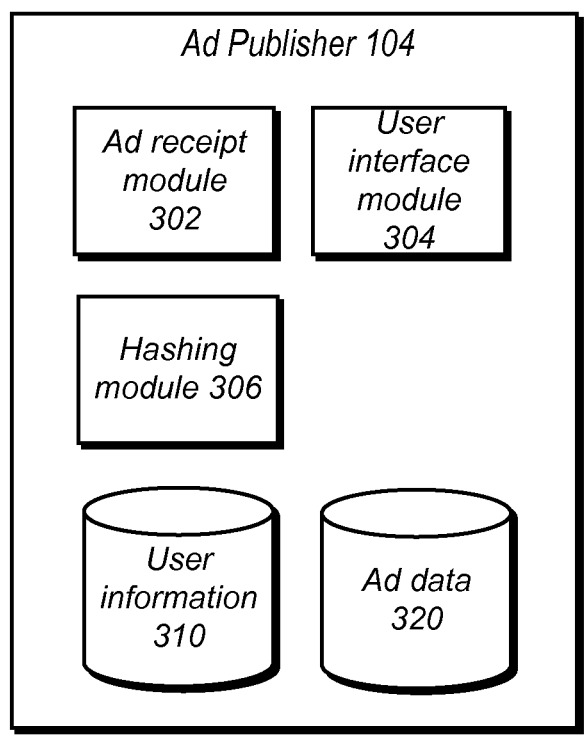
FIG. 3 illustrates an ad publisher system, in accordance with an embodiment of the invention.

Referring now to FIG. 3, illustrated is one embodiment of an ad publisher 104. The ad publisher includes an ad receipt module 302, a user interface module 304, a hashing module 306, a user information store 310, and an ad data 320.

The ad receipt module 302 provides the ad publisher 104 with a means of receiving advertisements from an advertiser 102. The ad receipt module communicates with one or more advertisers in order to receive ads, and then stores those ads in the ad data store 320. The ad receipt module may also receive a list of users or a list of secure identity hashes and store those in the ad data store with the associated advertisement.

The user interface module 304 provides the ad publisher 104 with a means to interact with its users. The user interface module 304 provides functionality similar to the user interface module 206 described above with respect to the advertiser 102. In addition, the user interface module provides the ad publisher with a means of publishing advertisements to the user. If, while using the ad publisher website, the user requests an advertisement, the user interface module interacts with the user information store and the ad data store in order to determine the appropriate advertisement for the user.

The hashing module 306 provides the ad publisher 104 with a means of generating a secure identifier hash. The hashing module 306 provides functionality similar to the hashing module 208 described above with respect to the advertiser 102. For the advertiser and the ad publisher to be compatible, the hashing module 208 and the hashing module 306 must support at least the same hashing function on the same item of PII. For example, both modules may support a pre-specified cryptographic hash on an email address.

The user information store 310 provides the ad publisher 104 with a store of user information. The user information store provides functionality similar to the user information store 210 described above with respect to the advertiser 102; however, it stores information relevant to the ad publisher.

The ad data store 320 provides the ad publisher 104 with a store of advertisements and data. The ad data store contains advertisements that have been received from an advertiser, as well as any associated lists of users or secure identifier hashes. The ad data store communicates with the user interface module 304 in order to provide advertisements for publication.

Figure 4:
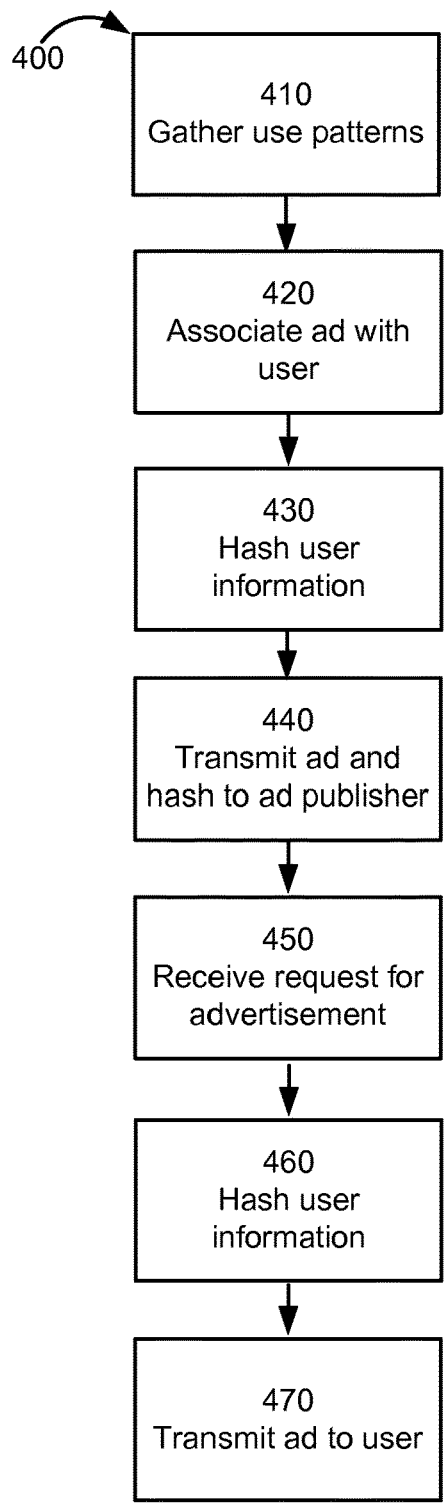
FIG. 4 is flow diagram illustrating a method for sharing user-targeted advertisement without revealing a user's PII, in accordance with an embodiment of the invention.

FIG. 4 illustrates an embodiment of a process 400 for sharing user-targeted advertisement without revealing a user's PII. The process 400 comprises collecting user information and targeting that user with an advertisement, using a hashing module to generating a secure identifier hash, transmitting that advertisement and secure identifier hash to an ad publisher, and, responsive to a request from a user, displaying that advertisement.

First, the advertiser 102 gathers 410, for a user, use patterns on its website as described above with respect to the user interface module 206. Based on these use patterns, the advertiser identifies a particular advertisement that is ideally suited for the user and associates 420 that advertisement with the user. The advertiser then identifies a piece of user information, such as an email address, and hashes 430 that user information as described above with respect to the hashing module 208. In various embodiments, the advertiser may have pre-hashed all of the user information, and this step then comprises performing a lookup in a hash table. The advertiser 102 then transmits 440 the advertisement and the associated secure identifier hash to the ad publisher 104 (along with, optionally, a set of identifier hashes for other users to whom the advertiser 102 wished to target the advertisement).

After the receiving the advertisement and placing it in its ad data store 320, the ad publisher 104 waits for a request from a user for an advertisement. The request for an advertisement need not be an explicit request therefor, but rather may comprise a request for content (such as a web page) in connection with which an advertisement may be shown to the user. When the ad publisher 104 receives 450 a request for an advertisement from a user, the ad publisher 104 identifies a piece of user information, such as an email address, and hashes 430 that user information as described above with respect to the hashing module 306. In various embodiments, the advertiser may have pre-hashed all of the user information, and this step then comprises performing a lookup in a hash table of the identifier hash associated with the user that has been already computed. The user information selected to hash must be same item of information hashed by the advertiser 102 in step 430. The type of user information selected may be predetermined prior to runtime, or it may be communicated when the advertisement is transmitted between the advertiser 102 and the ad publisher. Alternatively, the ad publisher may not know the type of user information of the transmitted hash. The ad publisher may hash all known user information, regardless of the type of user information, and perform a lookup against all these hashes. The advertiser may also submit more than one type of user information. For example, the advertiser may submit hashes of both email addresses and phone numbers. The ad publisher may then perform lookups of both types of user information. This allows the advertiser to target more users, as only some various types of user information may be known for all users.

After hashing the user identifier, the ad publisher 104 performs a lookup in the ad data store 320. If the secure identifier hash of the requesting user matches any of the hashes in the ad data store, the ad publisher may select one of those advertisements and transmit 470 the advertisement to the user. Alternatively, the ad publisher may include the ad in an auction process along with other candidate ads that may be transmitted to the user (e.g., based on the ads' associated targeting criteria) and then select an ad to transmit to the user from those candidate ads. This selection may be based on a computation to determine the advertisement of maximal value to the ad publisher based on cost-per-click (CPC) or cost-per-impression (CPI), among other metrics. If the secure identifier hash does not match any of the hashes in the data store, the ad publisher may rely on any of a number of algorithms to select an ad from the ad data store and transmit 470 the advertisement to the user.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, from an advertiser system, at an ad publisher system that is separate and external to the advertiser system, an advertisement to present to one or more target users, wherein the advertiser system maintains personally identifiable information associated with a set of users that includes the one or more target users;
   receiving by the ad publisher system from the advertiser system together with the advertisement, a listing of one or more secure identifier hashes, wherein each secure identifier hash is associated with a respective target user of the one or more target users, and wherein the one or more secure identifier hashes do not include any personally identifiable information associated with the corresponding one or more target users;
   receiving by the ad publisher system when the advertisement is communicated, an identification of a type of personally identifiable information associated with the one or more secure identifier hashes selected from a plurality of different types;
   receiving at the ad publisher system a request for content from a viewing user;
   retrieving an item of personally identifiable information from an account of the viewing user that uniquely identifiers the viewing user and that matches the type of personally identifiable information identified in the request;
   generating a secure identifier hash for the viewing user, the secure identifier hash generated from the item of personally identifiable information for the viewing user that matches the type of personally identifiable information identified in the request;
   determining, using a computer processor, that the viewing user is a target user based on whether the generated secure identifier hash for the viewing user matches any of the received secure identifier hashes associated with target users in the listing;
   based on determining that the viewing user is a target user, passing the advertisement to an auction process that determines a selected advertisement for the viewing user from a plurality of candidate advertisements, the plurality of candidate advertisements including the passed advertisement; and
   providing the selected advertisement for display to the viewing user.

2. The method of claim 1, wherein the one or more secure identifier hashes are a one-way function on the item of personally identifiable information of the viewing user or target user, or are a cryptographic hash on the item of personally identifiable information of the viewing user or target user.

3. The method of claim 1, wherein the item of personally identifiable information of the viewing user or target user is selected from the group consisting of a name, an email address, a phone number, a SIM card identifier, a MAC address, and a social security number.

4. The method of claim 1, wherein the ad publisher system is a social networking system, and the viewing user is a user of the social networking system.

5. A system comprising:
   a computer processor; and
   a computer readable storage medium comprising computer executable instructions that when executed by the computer processor perform actions comprising:
   receiving, from an advertiser system, at an ad publisher system that is separate and external to the advertiser system, an advertisement to present to one or more target users, wherein the advertiser system maintains personally identifiable information associated with a set of users that includes the one or more target users;
   receiving by the ad publisher system from the advertiser system together with the advertisement, a listing of one or more secure identifier hashes, wherein each secure identifier hash is associated with a respective target user of the one or more target users, and wherein the one or more secure identifier hashes do not include any personally identifiable information associated with the corresponding one or more target users;
   receiving by the ad publisher system when the advertisement is communicated, an identification of a type of personally identifiable information associated with the one or more secure identifier hashes selected from a plurality of different types;
   receiving at the ad publisher system a request for content from a viewing user;
   retrieving an item of personally identifiable information from an account of the viewing user that uniquely identifiers the viewing user and that matches the type of personally identifiable information identified in the request;
   generating a secure identifier hash for the viewing user, the secure identifier hash generated from the item of personally identifiable information for the viewing user that matches the type of personally identifiable information identified in the request;
   determining, using a computer processor, that the viewing user is a target user based on whether the generated secure identifier hash for the viewing user matches any of the received secure identifier hashes associated with target users in the listing;
   based on determining that the viewing user is a target user, passing the advertisement to an auction process that determines a selected advertisement for the viewing user from a plurality of candidate advertisements, the plurality of candidate advertisements including the passed advertisement; and
   providing the selected advertisement for display to the viewing user.

6. The system of claim 5, wherein the one or more secure identifier hashes are a transformation function on the item of personally identifiable information of the viewing user or target user, or is a one-way function on the item of personally identifiable information of the viewing user or target user.

7. The system of claim 5, wherein the item of personally identifiable information of the viewing user or target user is selected from the group consisting of a name, an email address, a phone number, a SIM card identifier, a MAC address, and a social security number.

8. The system of claim 5, wherein the ad publisher system is a social networking system, and the viewing user is a user of the social networking system.

9. A non-transitory computer readable storage medium storing computer executable instructions that when executed by a computer processor perform actions comprising:
receiving, from an advertiser system, at an ad publisher system that is separate and external to the advertiser system, an advertisement to present to one or more target users, wherein the advertiser system maintains personally identifiable information associated with a set of users that includes the one or more target users;
receiving by the ad publisher system from the advertiser system toaether with the advertisement, a listing of one or more secure identifier hashes, wherein each secure identifier hash is associated with a respective target user of the one or more target users, and wherein the one or more secure identifier hashes do not include any personally identifiable information associated with the corresponding one or more target users;
receiving by the ad publisher system when the advertisement is communicated, an identification of a type of personally identifiable information associated with the one or more secure identifier hashes selected from a plurality of different types;
receiving at the ad publisher system a request for content from a viewing user;
retrieving an item of personally identifiable information from an account of the viewing user that uniquely identifiers the viewing user and that matches the type of personally identifiable information identified in the request;
generating a secure identifier hash for the viewing user, the secure identifier hash generated from the item of personally identifiable information for the viewing user that matches the type of personally identifiable information identified in the request;
determining, using a computer processor, that the viewing user is a target user based on whether the generated secure identifier hash for the viewing user matches any of the received secure identifier hashes associated with target users in the listing;
based on determining that the viewing user is a target user, passing the advertisement to an auction process that determines a selected advertisement for the viewing user from a plurality of candidate advertisements, the plurality of candidate advertisements including the passed advertisement; and
providing the selected advertisement for display to the viewing user.

10. The non-transitory computer readable storage medium of claim 9, wherein the one or more secure identifier hashes are a transformation function on the item of personally identifiable information of the viewing user or target user, or is a one-way function on the item of personally identifiable information of the viewing user or target user.

11. The non-transitory computer readable storage medium of claim 9, wherein the item of personally identifiable information of the viewing user or target user is selected from the group consisting of a name, an email address, a phone number, a SIM card identifier, a MAC address, and a social security number.

12. The non-transitory computer readable storage medium of claim 9, wherein the ad publisher system is a social networking system, and the viewing user is a user of the social networking system.

* * * * *

UNITED STATES PATENT AND TRADEMARK OFFICE
CERTIFICATE OF CORRECTION

PATENT NO. : 10,339,562 B2  
APPLICATION NO. : 13/306901  
DATED : July 2, 2019  
INVENTOR(S) : Hong Yan et al.

Page 1 of 1

It is certified that error appears in the above-identified patent and that said Letters Patent is hereby corrected as shown below:

In the Claims

Column 9, Claim 9, Line 14, delete "toaether" and insert --together-- therefor

Signed and Sealed this  
Twenty-first Day of January, 2020

Andrei Iancu  
*Director of the United States Patent and Trademark Office*